May 27, 1969     I. P. MAIL ET AL     3,446,488
GAS BUBBLE GENERATING AND DISTRIBUTING SYSTEM
Filed Aug. 8, 1966
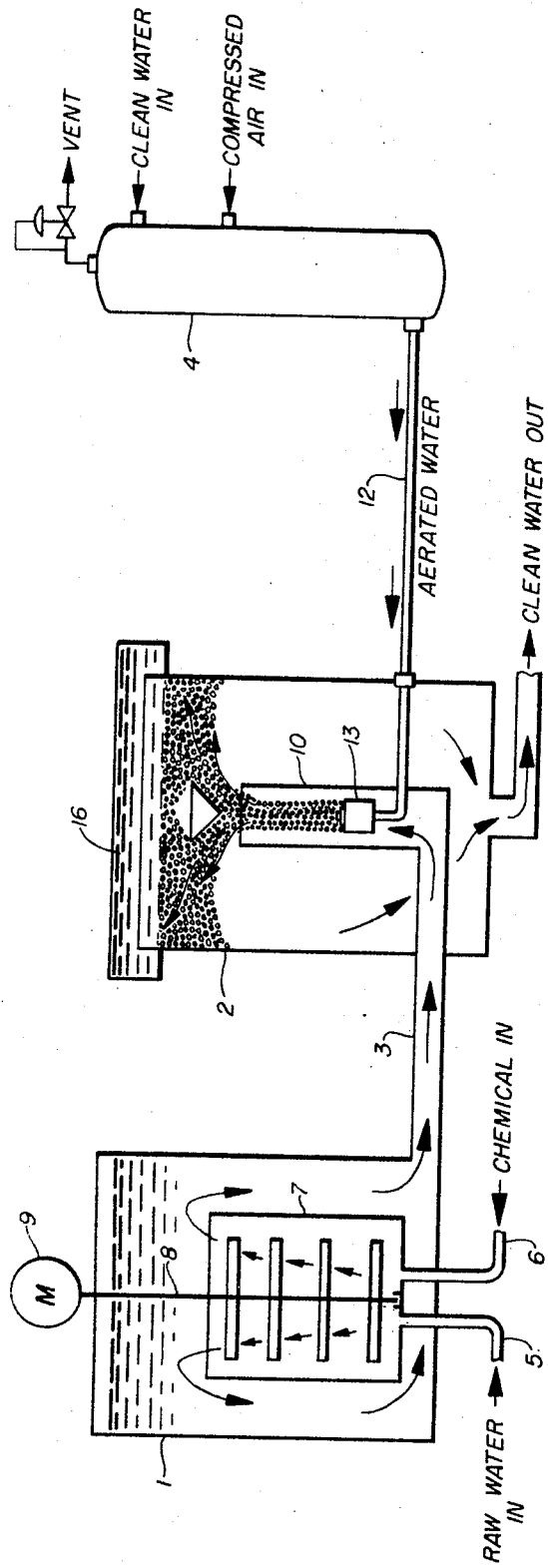
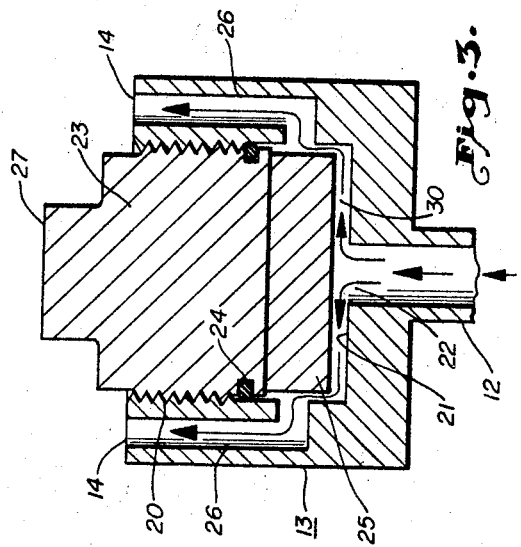
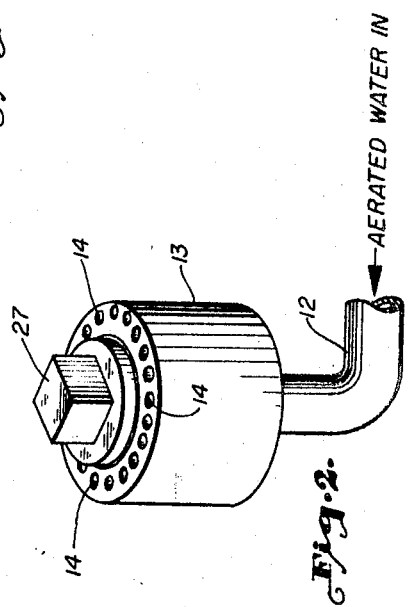
INVENTORS.
I. PAUL MAIL
WILLIAM E. COPPLE
BY
*Arthur L. Wade*
ATTORNEY

United States Patent Office

3,446,488
Patented May 27, 1969

3,446,488
GAS BUBBLE GENERATING AND
DISTRIBUTING SYSTEM
Isaac Paul Mail and William E. Copple, Tulsa, Okla., assignors to Combustion Engineering, Inc., New York, N.Y., a corporation of Delaware
Filed Aug. 8, 1966, Ser. No. 570,884
Int. Cl. C02b 1/20
U.S. Cl. 261—77     4 Claims

ABSTRACT OF THE DISCLOSURE

A device for the production of small bubbles from a gasified fluid is comprised of a housing in which a central cavity is formed with a face having a central opening, a plurality of passages formed in the housing to connect with the central opening, and a structure attached to the housing and providing decreased pressure for fluids flowing from the central opening to the plurality of passages. Means are provided to adjust the position of the structure with respect to the housing to determine the decrease in pressure.

---

The present invention is related to the removal of foreign matter from water by forming a floc with a coagulating agent and flotating the floc to the surface of the water with a gaseous medium.

Contamination of water with foreign material presents a widespread industrial problem. Filtration of the contaminates from polluted water has been employed. Various additives have been combined with the contaminates to facilitate removal of the combination by settling.

The present invention is embodied in a method of and apparatus for removing contaminates from water produced with oil. However, the contamination problems associated with this water are similar to the problems of all contaminated industrial water; the invention is not to be limited to the solution of the particular problem disclosed with oilfield water.

Where relatively large amounts of water are produced with oil, the disposal of the water is one problem. Residual oil, and other products from the well and treating processes, are mixed with the water. In effect, an oil-in-water emulsion remains, although this mixture is referred to as the "water" of the treating process.

A mixture of oil and water cannot be readily disposed of. If dumped into a river, pollution results. Also, the pits which are otherwise employed are unsightly and often limited in size.

A second problem descends with the use of steam to thermally stimulate oil production. The condensed steam becomes an additional water produced with the oil. Securing sufficient water for steam generation may have limitations. It may be highly desirable to recover some, or substantially all, of the water of the steam.

The more subjective problem centers around the basic decision to flocculate the solid foreign matter of contaminated water and float the floc upward, for separation from the water, with the air precipitated from aerated water. The air must be provided in small bubbles for efficient mixing with the floc. The air must not coalesce into larger bubbles prior to contact with the floc.

It is a principal object of the present invention to depressure aerated water in a flow path through a structure to provide a pressure drop to a sub-atmospheric value at which the gas will nucleate into bubbles of extremely small size. The invention then provides an isolated flow path for the mixture discharged from the structure in which additional gas will precipitate in small bubbles.

The present invention contemplates absorbing gas in a liquid under super-atmospheric pressure and passing the liquid through a structure to provide a pressure drop to a sub-atmospheric value at which the gas will nucleate into bubbles of extremely small size. The invention then provides an isolated flow path for the mixture discharged from the structure in which additional gas will precipitate in small bubbles.

Other objects, advantages and features of this invention will become apparent to one skilled in the art upon consideration of the written specification, appended claims, and attached drawings, wherein:

FIG. 1 is a diagrammatic flow diagram of a complete system in which the invention is embodied;

FIG. 2 is a perspective of the housing of FIG. 1 provided to depressure the aerated water; and FIG. 3 is a sectioned elevation of the housing to disclose the structure for depressuring the water and the connected isolated flow path for the depressured mixture.

The use of coagulating agents to remove contaminates from water is an old art. Ferric sulfate and aluminum sulfate are common agents. Ferric sulfate is generally employed where the water has a 5 to 10 pH range, or higher; aluminum sulfate is commonly employed when the pH is in a lower range. The sulfates will dissolve in the water and form hydroxides of a gelatinous form which oil and other contaminants will adhere and/or be absorbed.

The difference in density between a floc of hydroxide which is dispersed in water and water itself is slight. Normally, the hydroxide, with the contaminates adhering to and/or absorbed by it, has a density somewhat greater than that of water. If given sufficient residence time, this floc will gravitate to the bottom of any container of the mixture. However, if sufficient gas is distributed in the floc, the resulting mixture will be so much less dense than water that it will quickly float to the surface for ready removal. Subsequent filtration may be desirable to remove additional contaminates, but a high percentage of the contaminates can be removed by this flotation of floc of hydroxide.

Referring to the drawings, FIG. 1 depicts a first tank which embodies the first zone in which the floc is to be formed. Tank 1 is connected to a tank 2 by a conduit 3, tank 2 embodying the second zone in which the floc is floated to the top of the zone for removal.

The gas for flotation of the floc is represented by air, introduced from a tank 4 into tank 2. The air is introduced into the second zone so it will mix with the floc, the mixture floating to the top of tank 2.

There are many critical, specific problems in operating the apparatus to carry out the method. In tank 1 there is the specific problem of mixing the chemicals with the raw water. The raw water inlet 5 and chemical inlet 6 are shown connected into an inner chamber 7 which is mounted in tank 1. A stirring or mixing device is illustrated as a paddle 8, depending into chamber 7. A motor 9 is provided to actuate the paddle 8.

There may be many variations of this structure. Whatever the variations, the object is to bring the raw, contaminated water into intimate contact with a coagulating agent to promote the formation of a floc which will adhere to and/or absorb contaminates from the water.

The floc requires time to form and contact the contaminates of the raw water. After the initial formation and contact, a relatively quiet period should be provided during which floc growth and contact with contaminates are completed. Inner chamber 7 is provided for the mixing to give the initial floc formation and contact. Flow from the top of this mixing volume is downward, through the large volume provided by tank 1 to give at least four to six minutes of residence time for adequate floc growth and contact with the contaminates.

Once the floc is quietly formed with adequate residence time, the mixture of floc and water is transported as smoothly as possible to the second zone for flotation. Contact between the floc and a gaseous medium in the second zone is another problem. This contact is brought about in the second zone with a method and apparatus employing the present invention.

Inner conduit-chamber 10 is connected to conduit 3 to receive the floc and water mixture and discharge it over a wide cross-sectional area of the upper portion of tank 2. Air, as the gaseous medium, is released within this second zone so as to mix with the floc and float it upwards. The floc distribution and mixing with air can be carried out with other forms of structure, but they should all carry out the concept of mixing with the floc and even horizontal distribution of the mixture of floc and air to bring about the desired flotation.

Before the mixing and distribution and flotation functions are disclosed, the manipulation of air, as the gaseous flotation medium, will be described. In FIG. 1, tank 4 is provided for aerated water. Air is compressed and passed upward in tank 4 while clean water is passed downward. The water is thereby saturated with the air and flowed from the tank 4 through conduit 12. The various controls for tank 4 are not shown; only a controlled vent is indicated, keeping the tank under a pressure in excess of 40 p.s.i.g. In any event, the disclosure is basically of structure to produce aerated water at a super-atmospheric pressure for use in the second zone in tank 2.

The aerated water is depressed from super-atmospheric pressure to sub-atmospheric pressure in order to nucleate the air from the water in the form of extremely small bubbles. Following the step of nucleation, the mixture of bubbles and water is provided a flow path in which additional air precipitates from the water in bubbles which are also of small form. Both functions take place within housing 13 which is mounted within conduit-chamber 10 and on the end of conduit 12. The water and air bubbles, flow from housing 13 to horizontal distribution and mixing with the floc. The floc is thereby floated to the top of tank 2 in a body 16 which is readily removed by means not shown in this disclosure. FIG. 2 is intended to give a more comprehensive view of housing 13. The water and air bubbles are distributed horizontally in conduit-chamber 10 as evidenced by the arrangement of holes 14. So distributed, the air bubbles rise with the floc, mix with it and carry it to the top of tank 2 in a body 16.

FIG. 3, together with FIG. 2, gives further understanding to the details of the preferred form of the structure with which the process of the invention is carried out. Housing 13 is disclosed in sectioned elevation, illustrating how the fluids of conduit 12 flow into the housing and are divided equally to the holes 14. The invention is in the provision for reduction of pressure in the paths from conduit 12 to the holes 14.

Housing 13 is counterbored at 20 to provide an internal surface 21 about the opening 22 from conduit 12. A plug 23 is threaded into counterbore 20 and sealed therein at 24. The lower end 25 of plug 23 is formed as a plug with a selected clearance with the sides of the counterbore 20.

Passages 26 are drilled down, vertically, in the edge of the housing and connected with the bore 20 near the surface 21. These passages 26 appear as openings 14 in the upper surface of the housing 13. They communicate with conduit 12 between the surface of plug 25 and the internal surface 21.

The lower end 25 of plug 23 can be made as a separate structure for ready change in size to fix the capacity of the passage for the fluids through the housing. This size, together with the position of the plug above surface 21, sets the capacity. The plug 23 is positioned by threading in, or out, of the housing. A wrench head 27 is formed on the end of plug 23 for convenience in positioning plug 23 within the housing 13.

The vital feature of the foregoing arrangement is the passage 30 provided between plug 25 and the internal surface of housing 13. This passage is sized, by the foregoing structure, to form a decreased pressure pattern in the flow path of passage 30. A pressure is produced within the passage which is quite a bit less than the super-atmospheric pressure of conduit 12. As a matter of fact, the pressure reduces to a value less than atmospheric.

The pressure reduction in passage 30 causes the gas in the liquid to nucleate into the form of extremely small bubbles. Passage 26 is then positioned to receive the mixture of liquid gas and direct it upward, maintaining it isolated for a finite length of travel. During this travel, more air precipitates from the water, adding to the bubbles nucleated within passage 30. As the mixture of bubbles and liquid are discharged from opening 14, the air bubbles commingle with floc and remove it upward.

CONCLUSION

In the final analysis, aerated and pressurized water is conducted into a volume chamber in which it is caused to spread radially to multiple passages which are connected as outlets for the volume chamber. In the flow path to the multiple passages, structure is provided to reduce the pressure of the water until air nucleates from the water. The mixture is then conducted in isolation for the travel length and time required to precipitate additional air from the water. The water and air bubbles are then released to mingle with floc for floating it up and away from water which is being treated.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gas bubble generating and distributing system, including,
   a housing in which a central cavity is formed with a face through which a central opening is arranged and about which central cavity a plurality of passages are formed in the housing and connected to the central opening by their internal ends,
   a plug body inserted into the central cavity of the housing to form passageways of predetermined size from the central opening to the formed passages to receive the flow of fluid through the passageways, and
   means for supplying a liquid under super-atmospheric pressure with a quantity of gas absorbed therein, the absorbed gas nucleating from the liquid in the form of bubbles as the liquid flows in the passageways from the central opening to which the supply means are connected.

2. The system of claim 1, including,
   means connected to the plug body with which to adjust the position of the body in the central cavity of the housing to establish the size of the passageways.

3. A gas bubble generating and distributing system, including,
   means for supplying a liquid under super-atmospheric pressure with a quantity of gas absorbed therein,
   a housing connected to the supply of liquid and including a structure arranged so as to receive the flow of the liquid and absorbed gas through a first flow path in which the pressure is reduced to a lesser value, causing the absorbed gas to begin to nucleate from the liquid in the form of bubbles, a passage within the housing connected to the exit of the first flow path and arranged to form a second flow path for isolation of the mixture flowing from the first flow path to provide for precipitation of additional gas as bubbles, and means adjustably connected to the housing, the adjustment of the means relative to the housing establishing the size of the first flow path.

4. A gas bubble generating and distributing system, including, means for supplying a liquid under super-atmospheric pressure with a quantity of gas absorbed therein, a housing connected to the supply of liquid and including a structure arranged so as to receive the flow of the liquid and absorbed gas through a first flow path in which the pressure is reduced to a lesser value, causing the absorbed gas to begin to nucleate from the liquid in the form of bubbles, a passage within the housing connected to the exit of the first flow path and arranged to form a second flow path for isolation of the mixture flowing from the first flow path to provide for precipitation of additional gas as bubbles, and automatically adjustable means connected to the housing, the automatic adjustment of the means relative the housing establishing the size of the first flow path.

References Cited
UNITED STATES PATENTS

| 2,088,624 | 8/1937 | Tschudy | 261—77 X |
| 2,330,589 | 9/1943 | Juell | 210—44 |
| 2,645,350 | 7/1953 | Nordstrand | 261—77 X |
| 2,789,633 | 4/1957 | Flynn | 239—552 X |

MICHAEL E. ROGERS, *Primary Examiner.*

U.S. Cl. X.R.

210—44, 221; 239—548; 261—124